United States Patent
Jain et al.

(10) Patent No.: US 9,529,631 B2
(45) Date of Patent: Dec. 27, 2016

(54) AUTOMATIC TASK EXECUTION ON MOBILE DEVICES

(71) Applicant: International Business Machines Corporation, Armonk, NY (US)

(72) Inventors: Rakesh Jain, San Jose, CA (US); Ramani R. Routray, San Jose, CA (US); Yang Song, San Jose, CA (US); Chung-Hao Tan, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 13 days.

(21) Appl. No.: 14/636,210

(22) Filed: Mar. 3, 2015

(65) Prior Publication Data

US 2016/0259669 A1 Sep. 8, 2016

(51) Int. Cl.
*G06F 9/46* (2006.01)
*G06F 9/50* (2006.01)
*H04M 1/725* (2006.01)
*G06F 3/0484* (2013.01)

(52) U.S. Cl.
CPC ........... *G06F 9/5011* (2013.01); *G06F 3/0484* (2013.01); *H04M 1/72522* (2013.01)

(58) Field of Classification Search
None
See application file for complete search history.

(56) References Cited

U.S. PATENT DOCUMENTS

| 8,627,323 B2 | 1/2014 | Irani et al. |
| 2007/0011334 A1 | 1/2007 | Higgins et al. |
| 2009/0044185 A1 | 2/2009 | Krivopaltsev |

OTHER PUBLICATIONS

Disclosed Anonymously "A Policy-controlled Adaptive Platform for Querying Real-time SmartPhone Data", An IP.com Prior Art Database Technical Disclosure; IP.com No. IPCOM000228639D; IP.com Electronic Publication Jun. 26, 2013; 10 pgs.
Silva et al., "A Framework for Processes Submission and Monitoring from Mobile Devices to Grid Configurations Utilizing Resource Matching", Jul. 2007; 2007 IEEE, pp. 749-756.
Zhou et al., "System and Methods for Record & Replay of Web-based Mobile Tasks", An IP.com Prior Art Database Technical Disclosure; IP.com No. IPCOM000198571D; IP.com Electronic Publication: Aug. 9, 2010; 14 pgs.

*Primary Examiner* — Gregory A Kessler
(74) *Attorney, Agent, or Firm* — Cantor Colburn LLP; Bryan W Butler

(57) ABSTRACT

Embodiments of the disclosure relate to automatic task execution on a mobile device. Aspects include identifying, by a processor, one or more hardware resources on the mobile device, identifying one or more patterns for each of the one or more hardware resources, and generating one or more composite patterns recognizable by the mobile device based on the one or more patterns. Aspects further include identifying one or more operations that can be performed via the mobile device and receiving, via a user-interface, an association between at least one of the one or more patterns and the one or more composite patterns and an execution of at least one of the one or more operations.

18 Claims, 4 Drawing Sheets

AUTOMATIC TASK EXECUTION ON MOBILE DEVICES

BACKGROUND

The present disclosure relates to automatic task execution on mobile devices, and more specifically, to methods, systems and computer program products for automatic task execution on mobile devices based on pattern recognition.

Mobile devices become pervasive in todays society and many mobile devices are equipped with advanced hardware which may include, but are not limited to, high resolution cameras, high precision location and motion sensors, and high speed processors. In addition, many mobile devices can be used to execute a variety of software applications, such as email clients, social network applications, and photo applications with advanced image detection/tagging/processing algorithm implementation. As a result, mobile devices are used not only for communications, but also serve as an essential tool for many use cases ranging from entertainment to business work. As used herein, the term mobile device may refer to a smart phone, a tablet, a phablet or the like.

SUMMARY

According to one embodiment, a method for automatic task execution on mobile devices is provided. The method includes identifying, by a processor, one or more hardware resources on the mobile device, identifying one or more patterns for each of the one or more hardware resources, and generating one or more composite patterns recognizable by the mobile device based on the one or more patterns. The method further includes identifying one or more operations that can be performed via the mobile device and receiving, via a user-interface, an association between at least one of the one or more patterns and the one or more composite patterns and an execution of at least one of the one or more operations.

According to another embodiment, a computer program product for automatic task execution on mobile devices, the computer program product including a tangible storage medium readable by a processing circuit and storing instructions for execution by the processing circuit for performing a method that includes identifying, by a processor, one or more hardware resources on the mobile device, identifying one or more patterns for each of the one or more hardware resources, and generating one or more composite patterns recognizable by the mobile device based on the one or more patterns. The method further includes identifying one or more operations that can be performed via the mobile device and receiving, via a user-interface, an association between at least one of the one or more patterns and the one or more composite patterns and an execution of at least one of the one or more operations.

According to another embodiment, a mobile device having a processor configured to perform automatic task execution is provided. The processor is configured to identify one or more hardware resources on the mobile device, identify one or more patterns for each of the one or more hardware resources, and generate one or more composite patterns recognizable by the mobile device based on the one or more patterns. The processor is further configured to identify one or more operations that can be performed via the mobile device and to receive, via a user-interface, an association between at least one of the one or more patterns and the one or more composite patterns and an execution of at least one of the one or more operations.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, a mobile device includes a plurality of sensors and a processor that is capable of performing a plurality of operations, the processor is configured to automatically perform a sequence of operations based on recognition of a pattern. In exemplary embodiments, a method for automatic task execution on mobile devices based on pattern recognition includes identifying the available sensors on the mobile device and the patterns that can be detected by each of the sensors. The method also includes associating the patterns, or combinations of patterns, with one or more operations that can be executed by the mobile device.

Figure 1:
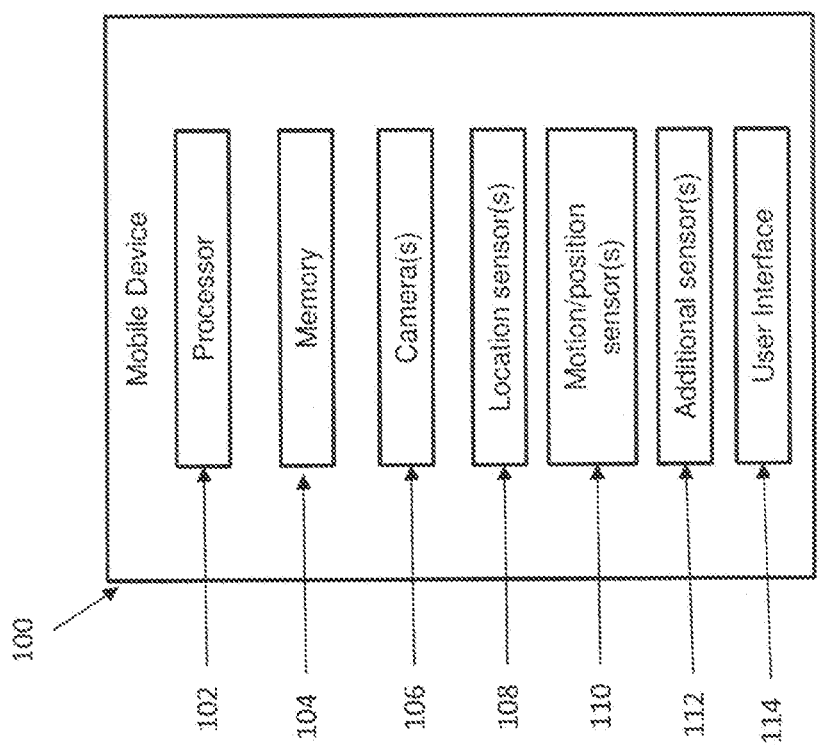
FIG. 1 is a block diagram illustrating one example of a mobile device for practice of the teachings herein.

Referring to FIG. 1, there is shown an embodiment of a mobile device 100 for implementing the teachings herein. In this embodiment, the mobile device 100 has one or more central processing units (processors) 102. The processor 102 is coupled to a memory 104 and various other components via a system bus (not shown). In exemplary embodiments, the mobile device 100 also includes one or more cameras 106. The cameras 106 may include both a high resolution camera and a low resolution camera. For example, many mobile devices 100 include a front facing camera that has a lower resolution as compared to a rear facing camera on the mobile device 100.

In exemplary embodiments, the mobile device 100 may include one or more location sensors 108. For example, the mobile device 100 may include a GPS sensor that can be used to determine a highly accurate location of the mobile device 100. Likewise, the mobile device 100 may include a location sensor 108 that is configured to utilize WiFi or cellular networks to obtain an approximate location of the mobile device 100. In exemplary embodiments, the mobile device 100 may include one or more motion or position sensors 110 that may include, but are not limited to, an accelerometer, a gyroscope, or the like. In addition, the mobile device 100 may include a wide variety of additional sensors 112 that can be used to measure the operating conditions and/or environment of the mobile device 100. In exemplary embodiments, each of the various sensors of the mobile device 100 is capable of obtaining one or more types of input and the processor 102 can be configured to identify a recognizable pattern in the input provided by the sensors.

In exemplary embodiments, the mobile device 100 includes user interface 114. The user interface 114 may include a touch screen device that can be used to interact with the mobile device 100 using a finger or a stylus. In addition, the user interface 114 may include a physical keyboard or voice command that can be used to receive commands from a user.

Figure 2:
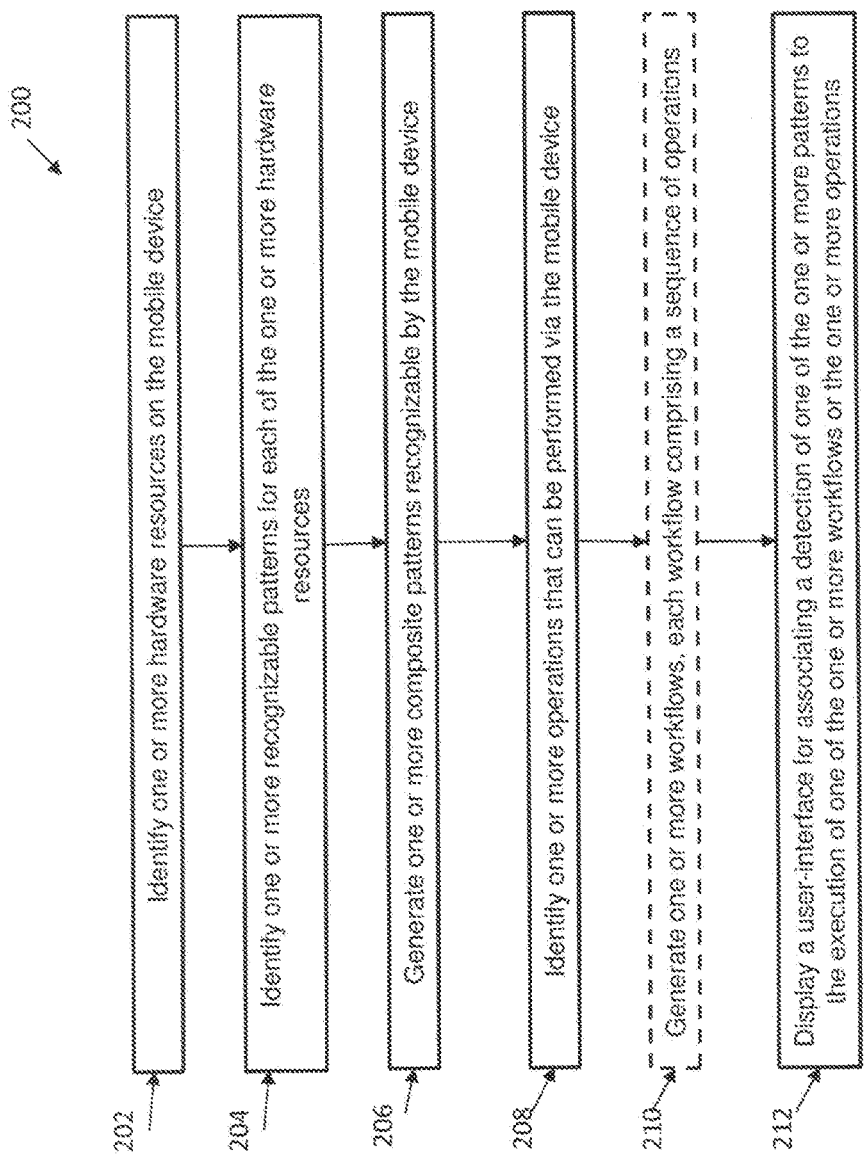
FIG. 2 is a flow diagram of a method for configuring automatic task execution on a mobile device in accordance with an exemplary embodiment.

Referring now to FIG. 2, a flow diagram of a method 200 for configuring automatic task execution on a mobile device in accordance with an exemplary embodiment is shown. As shown at block 202, the method 200 includes identifying one or more hardware resources on the mobile device. For example, the method may include querying the mobile device to determine the available hardware resources on the mobile device. Next, the method 200 includes identifying one or more recognizable patterns for each of the one or more hardware resources, as shown at block 204. In exemplary embodiments, the one or more recognizable patterns are patterns that are based on the type of the sensors. For example, if a sensor is a location sensor, the recognizable pattern may be the mobile device being within a geographic area or at a specific location. In another example, if the sensor is a camera, the recognizable pattern may be an optical character recognition algorithm and analysis of the captured text or a facial recognition algorithm and analysis of the captured image. In exemplary embodiments, each of the various sensors of the mobile device 100 is capable of obtaining one or more types of input and the processor 102 can be configured to identify a recognizable pattern in the input provided by the sensors.

In one example, a hardware resource list of the mobile device may include a GPS sensor, a camera, and a voice recorder. For each identified hardware device, a list of basic recognizable patterns (hardware specific) will be generated using pre-loaded hardware-pattern templates and/or user-defined templates. For example, for GPS hardware, an exemplary hardware-pattern template would be the "location in longitude and latitude." For the camera hardware, its predetermined hardware-pattern template may be recognizable shapes such as "square" "zig-zag" "triangle" or any graphic patterns that can be recognized by an image analysis application (possibly via training, OCR, or basic drawing shapes prior to releasing the app). For the voice recorder, its hardware-pattern template might include voice commands, in the form of words and phrases, such as "Tweet," "Post," "Email myself personal email" "Email my work email," or the like which can be recognized by the speech recognition function of the mobile device. Accordingly, for this example, after identifying the three hardware on this device (GPS, Camera, Voice Recorder), hardware dependent pattern templates are applied to identify a set of "basic recognizable patterns" that can be perceived and identified by the mobile device.

In exemplary embodiments, the user of a mobile device may create custom basic recognizable patterns. For example, after identifying the GPS hardware on the device, the user can to create "location near Home/Office" as a user-defined basic recognizable pattern, where each user can customize his/her home address and office address. This applies to other hardware-pattern templates such as user-defined voice commands etc. For example, a user may specify if a picture is taken with "location near Home" pattern identified, automatically upload to a photo sharing service while if a picture is taken with "location near Office" pattern identified, automatically email the picture to work email address and cc to personal email address etc.

Continuing with reference to FIG. 2, as shown at block 206, the method 200 includes generating one or more composite patterns recognizable by the mobile device. In exemplary embodiments, the one or more composite patterns are combinations of the one or more recognizable patterns identified. For example, "GPS location+a voice command" can be a composite pattern. More specifically, a user can define two composite patterns (a) "GPS location near Home"+"take picture" voice command and (b) GPS location near Office+"take picture". In exemplary embodiments, the mobile device will retrieve both GPS information and the voice command match to determine whether one of the composite patterns is matched. In exemplary embodiments, the mobile device can retrieve information from multiple hardware devices simultaneously to detect whether a composite pattern is present, for example, by comparing the timestamp of multiple information sources. If the timestamp difference between retrieving picture from camera and voice command from microphone is within a predetermined "concurrency tolerance threshold" e.g., 50 ms, the mobile device can treat the two information sources as concurrent events in order to verify whether a composite pattern is matched.

In one example, the composite pattern may include a picture having a specific text that is taken when the mobile device is at a specific location. In such an example, a user may desire to take a picture of a whiteboard or other item during a business meeting at an office and may configure the mobile device to automatically perform a sequence of actions based on the captured image having specific text and being captured at the office. In another example, the composite pattern may include a picture having a specific person that is taken when the mobile device is at a specific location or during a specific time period.

Next, the method 200 includes identifying one or more operations that can be performed via the mobile device, as shown at block 208. Such operations may include, but are not limited to, emailing a file, posting a picture to a social media page, sharing a file via a file sharing service, creating a calendar entry, adding an item to a task list, sending a message to a recipient, or the like. In exemplary embodiments, the mobile device can scan the installed software and default software on the device to obtain the list of device-specific actions. For example, if an email client is identified, "Email To" action is enabled. If Twitter™ software is identified, "create a tweet" action is enabled.

As shown at block 210, the method 200 optionally includes generating one or more workflows, each workflow comprising a sequence of operations that can be performed via the mobile device. Workflows may combine multiple simple actions, e.g., "send an email to my personal email account and save a copy to online storage, then set up a follow-up reminder in my notes" etc. The mobile device may have different default software and user-installed software; our module will create a device-specific list of actions which can be performed by the device where our invention is running.

Next, the method 200 includes displaying a user-interface for associating a detection of one of the one or more patterns to the execution of one of the one or more operations, or workflows, as shown at block 212. In exemplary embodiments, the user interface can expose all patterns basic, composite, preloaded and user-defined as well as all actions on the device to the user to select how the association rule will be created. For example, an association rule can specify that once a picture is taken with an oval shape with "@Email" tag is identified (e.g., via OCR), the composite action of "Open default email client to send an email, where the recipient is the first valid email address identified within the oval shape block, and the email body is the rest of the text contents within the oval box". The set of association rules can be preconfigured and preloaded, or allowing users to customize to fit their own workflow requirements and specifications.

The following example is used to illustrate one embodiment of the disclosure and is not intended to be limiting in any way. Commonly during a meeting, notes are taken on a whiteboard or notepad. These notes often include follow-up actions or other action items. FIG. 3A illustrates an image 300 showing notes taken during a meeting. As illustrated, the image includes the following action items: (1) an email summary should be sent to john@uc.ibm.com, (2) another meeting with bob@uc.ibm.com should be scheduled for Sep. 1, 2014, and (3) add "write a disclosure" to the "TO-DO" list to capture the discussed idea.

Currently, in order to avoid writing the discussion results down on paper, a user of a mobile device can use a mobile device to take a picture. Later, the user can view the picture and take the following actions (1) open an email client to send an email to john@uc.ibm.com with the information in the "Email" section; (2) open a calendar application to send an email to bob@uc.ibm.com with the specific date, and (3) add an item of "write a disclosure" to the "TO-DO" list (e.g., part of calendar/email application), possibly all on the mobile device itself.

In exemplary embodiments, the method of automatic workflow execution on the mobile device can be used to automate the process of the user manually executing the action items capture in the image 300. In the example above, after the picture is taken by the camera, the mobile device will parse the image and trigger corresponding applications for task execution in an automatic, customizable, flexible way. In exemplary embodiments, the mobile device may use an optical character recognition (OCR) algorithm and/or one or more image analysis tools to parse the image.

In exemplary embodiments, the user may utilize the user interface of the mobile device to annotate the image 300 captured to add syntax that can be used by the mobile device to parse the image. In exemplary embodiments, the syntax includes symbols includes a predefined set of patterns that can be mapped to one or more actions to be taken by the mobile device. In exemplary embodiments, an application on the mobile device identifies that the mobile device has a camera available, and allows the user to specify types of operations associated with each sensed event, i.e., a picture is taken containing specific shapes.

Figure 3B:
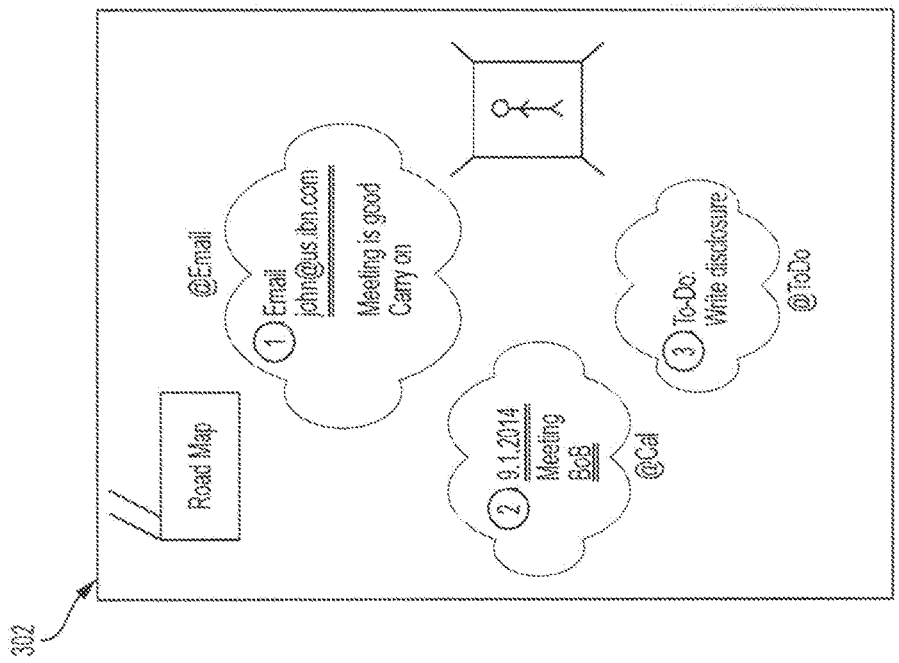
FIG. 3B illustrates an annotated captured image of meeting notes in accordance with an exemplary embodiment.
Figure 3A:
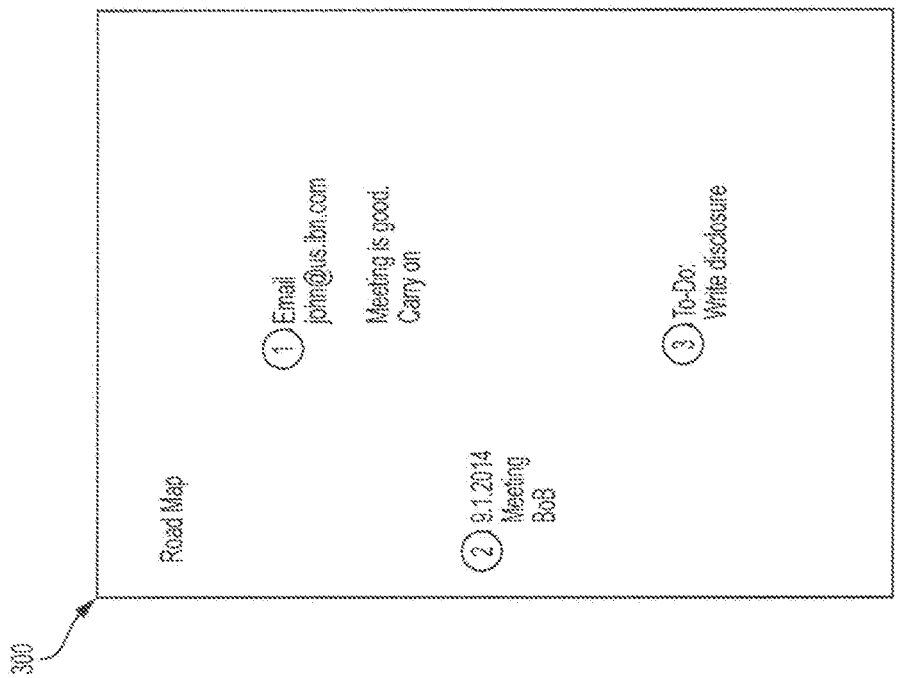
FIG. 3A illustrates a captured image of meeting notes in accordance with an exemplary embodiment.

FIG. 3B, illustrates an example of an annotate image 302 that includes syntax added by the user. In exemplary embodiments, the processor of the mobile device may be configured to execute a workflow on the mobile device upon the user annotating the captured image or upon detecting a captured image that was previously annotated, i.e., the user annotated the image prior to being captured. The workflow includes discarding without further processing the captured text of "Roadmap" as being annotated as a "Comment." The workflow also includes an annotation of a "Verbatim," which is the drawing of a cartoon logo (the image portion that is within the verbatim symbol boundary) and will be saved as jpeg and saved to Dropbox. The workflow will also include three blocks with specific configured actions. For the block with "@Email", the mobile device will automatically launch the default email application and draft an email with recipient as john@uc.ibm.com (e.g., configured as the first valid email address comprehended by the OCR of block content), and an email body of "Meeting is good. Carry on". For the block with "@Cal", the mobile device will automatically launch the default calendar application and add a meeting entry on Sep. 1, 2014 with "Bob" in the device contact. For the block with "@ToDo", the mobile device will launch the configured application, e.g., the same calendar application, to add a to-do list entry of "write disclosure". Note that all the symbols/patterns and syntax (how to trigger actions after a matching is identified) can be configured by the user, supplementing the preconfigured set of choices.

While the above example only illustrates one sensor (i.e., camera for picture taking), it will be appreciated by those of ordinary skill in the art that the method may be applied to mobile devices with multiple sensors. The disclosed systems and methods can identify available sensors on mobile devices and associating combinations of them with operations in the context of foundation and execution of workflow on the mobile device.

Figure 4:
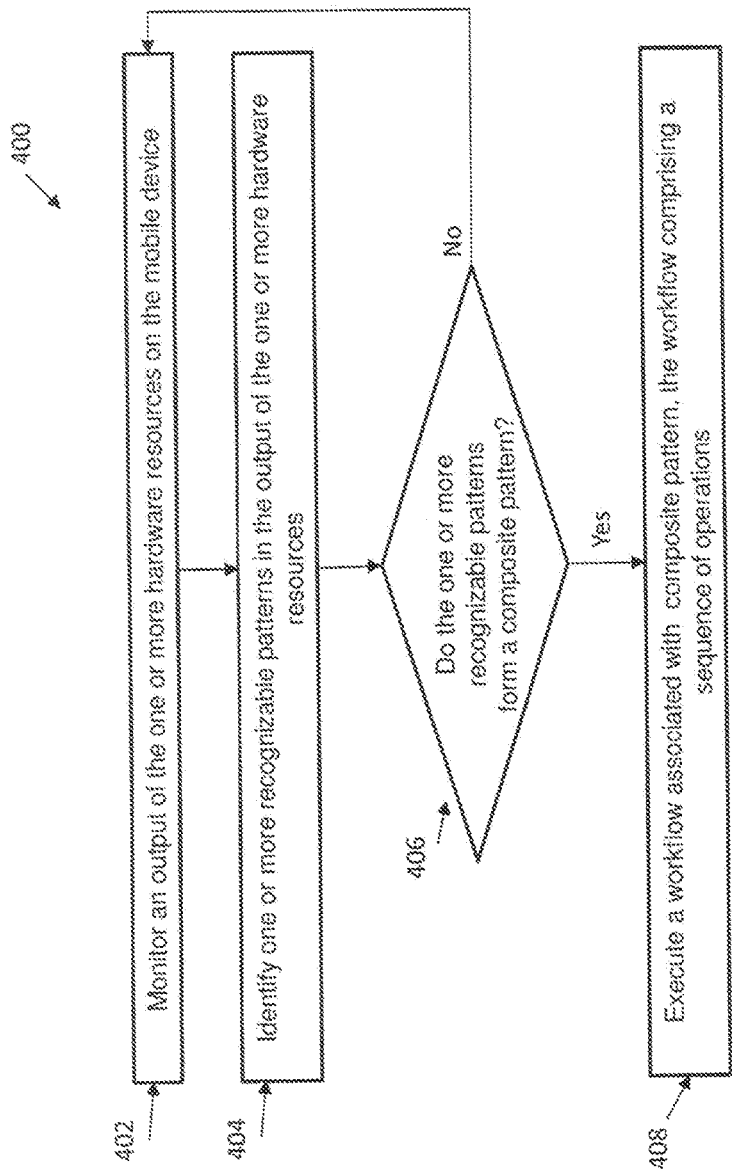
FIG. 4 is a flow diagram of a method for performing automatic task execution on a mobile device in accordance with an exemplary embodiment.

Referring now to FIG. 4, a flow diagram of a method 400 for performing automatic task execution on a mobile device in accordance with an exemplary embodiment is shown. As shown at block 402, the method 402 includes monitoring an output of the one or more hardware resources on the mobile device. Next, the method 400 includes identifying one or more recognizable patterns in the output of the one or more hardware resources, as shown at block 404. As shown at decision block 406, the method 400 includes determining if the one or more recognizable patterns form a composite pattern. If the one or more recognizable patterns form a composite pattern, the method 400 proceeds to block 408 and executes a workflow associated with composite pattern, the workflow comprising a sequence of operations. Otherwise, the method 400 returns to block 402.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for automatic task execution on a mobile device comprising:
   identifying, by a processor, one or more hardware resources on the mobile device;
   identifying one or more patterns for each of the one or more hardware resources, wherein each of the one or more patterns is based on a type of hardware resource;
   generating one or more composite patterns recognizable by the mobile device based on the one or more patterns, wherein the one or more composite patterns include at least two of the one or more patterns that are from different hardware resources;
   identifying one or more operations that can be performed via the mobile device; and
   receiving, via a user interface, an association between at least one of the one or more composite patterns and an execution of at least one of the one or more operations;
   wherein the one or more composite patterns further include a concurrency tolerance threshold for determining that the at least two of the one or more patterns are treated as concurrent events, wherein the concurrency tolerance threshold is a maximum time difference between the at least two of the one or more patterns.

2. The method of claim 1, further comprising:
   monitoring an output of the one or more hardware resources on the mobile device; and
   identifying at least of one or more patterns and the one or more composite patterns in the output of the one or more hardware resources.

3. The method of claim 2, further comprising:
   based on the identification of the at least of one or more patterns and the one or more composite patterns, executing, by the processor, the at least one of the one or more operations associated with an identified pattern.

4. The method of claim 1, further comprising:
generating one or more workflows each comprising a sequence of the one or more operations; and
receiving via the user-interface an association between at least one of the one or more patterns and the one or more composite patterns and an execution of at least one of the one or more workflows.

5. The method of claim 4, further comprising:
monitoring an output of the one or more hardware resources on the mobile device; and
identifying at least of one or more patterns and the one or more composite patterns in the output of the one or more hardware resources.

6. The method of claim 5, further comprising:
based on the identification of the at least of one or more patterns and the one or more composite patterns, executing one of the one or more workflows associated with an identified pattern.

7. A computer program product for automatic task execution on a mobile device, comprising a computer readable storage medium having program code embodied therewith, the program code is executable by a processor to:
identify one or more hardware resources on the mobile device;
identify one or more patterns for each of the one or more hardware resources, wherein each of the one or more patterns are based on a type of hardware resource;
generate one or more composite patterns recognizable by the mobile device based on the one or more patterns, wherein the one or more composite patterns include at least two of the one or more patterns that are from different hardware resources;
identify one or more operations that can be performed via the mobile device; and
receive via a user-interface an association between at least one of the one or more composite patterns and an execution of at least one of the one or more operations,
wherein the one or more composite patterns further include a concurrency tolerance threshold for determining that the at least two of the one or more patterns are treated as concurrent events, wherein the concurrency tolerance threshold is a maximum time difference between the at least two of the one or more patterns.

8. The computer program product of claim 7, wherein the program code is executable by the processor to further:
monitor an output of the one or more hardware resources on the mobile device; and
identify at least of one or more patterns and the one or more composite patterns in the output of the one or more hardware resources.

9. The computer program product of claim 8, wherein the program code is executable by the processor to further:
based on the identification of the at least of one or more patterns and the one or more composite patterns, execute the at least one of the one or more operations associated with an identified pattern.

10. The computer program product of claim 7, wherein the program code is executable by the processor to further:
generate one or more workflows each comprising a sequence of the one or more operations; and
receive via the user-interface an association between at least one of the one or more patterns and the one or more composite patterns and an execution of at least one of the one or more workflows.

11. The computer program product of claim 10, wherein the program code is executable by the processor to further:
monitor an output of the one or more hardware resources on the mobile device; and
identify at least of one or more patterns and the one or more composite patterns in the output of the one or more hardware resources.

12. The computer program product of claim 11, wherein the program code is executable by the processor to further:
based on the identification of the at least of one or more patterns and the one or more composite patterns, executing one of the one or more workflows associated with an identified pattern.

13. A mobile device having a processor configured to perform automatic task execution; wherein the processor is configured to:
identify one or more hardware resources on the mobile device;
identify one or more patterns for each of the one or more hardware resources, wherein each of the one or more patterns are based on a type of hardware resource;
generate one or more composite patterns recognizable by the mobile device based on the one or more patterns, wherein the one or more composite patterns include at least two of the one or more patterns that are from different hardware resources;
identify one or more operations that can be performed via the mobile device; and
receive via a user-interface an association between at least one of the one or more composite patterns and an execution of at least one of the one or more operations,
wherein the one or more composite patterns further include a concurrency tolerance threshold for determining that the at least two of the one or more patterns are treated as concurrent events, wherein the concurrency tolerance threshold is a maximum time difference between the at least two of the one or more patterns.

14. The mobile device of claim 13, wherein the processor is further configured to:
monitor an output of the one or more hardware resources on the mobile device; and
identify at least of one or more patterns and the one or more composite patterns in the output of the one or more hardware resources.

15. The mobile device of claim 14, wherein the processor is further configured to:
based on the identification of the at least of one or more patterns and the one or more composite patterns, execute the at least one of the one or more operations associated with an identified pattern.

16. The mobile device of claim 13, wherein the processor is further configured to:
generate one or more workflows each comprising a sequence of the one or more operations; and
receive via the user-interface an association between at least one of the one or more patterns and the one or more composite patterns and an execution of at least one of the one or more workflows.

17. The mobile device of claim 16, wherein the processor is further configured to:
monitor an output of the one or more hardware resources on the mobile device; and
identify at least of one or more patterns and the one or more composite patterns in the output of the one or more hardware resources.

18. The mobile device of claim 17, wherein the processor is further configured to:
 based on the identification of the at least of one or more patterns and the one or more composite patterns, execute one of the one or more workflows associated with an identified pattern.

\* \* \* \* \*